United States Patent [19]

Naito et al.

[11] Patent Number: 4,646,354
[45] Date of Patent: Feb. 24, 1987

[54] AREA MEASURING APPARATUS USING TELEVISION

[75] Inventors: Akira Naito; Tetsuzi Kodama; Hideki Tsuruse; Hironobu Tsutsumi; Hiroshi Ushio, all of Kanagawa, Japan

[73] Assignee: Mitsubishi Denki Kabushiki Kaisha, Tokyo, Japan

[21] Appl. No.: 664,747

[22] Filed: Oct. 25, 1984

[30] Foreign Application Priority Data

Oct. 26, 1983 [JP]  Japan .................................. 58-200438

[51] Int. Cl.$^4$ .............................................. G06K 9/00
[52] U.S. Cl. ..................................................... 382/28
[58] Field of Search ..................... 382/28, 22; 364/564

[56] References Cited

U.S. PATENT DOCUMENTS

| | | | |
|---|---|---|---|
| 3,967,242 | 6/1976 | Isoo et al. | 382/28 |
| 3,976,827 | 8/1976 | Alien et al. | 382/28 |
| 4,156,231 | 5/1979 | Edamatsu et al. | 364/564 |

Primary Examiner—Stephen A. Kreitman
Attorney, Agent, or Firm—Bernard, Rothwell & Brown

[57] ABSTRACT

An area measuring apparatus for measuring the surface area of an object by the use of a TV camera. The apparatus comprises a comparator which separates a component corresponding to the image of the object from the image signal obtained with the TV camera; a gate circuit which allows a clock signal to pass only while the image component is detected; and an arithmetic circuit which counts the pulses of the clock signal allowed to pass the gate circuit and corresponding to a single frame of the image signal and converts the pulse counts into an area.

11 Claims, 11 Drawing Figures

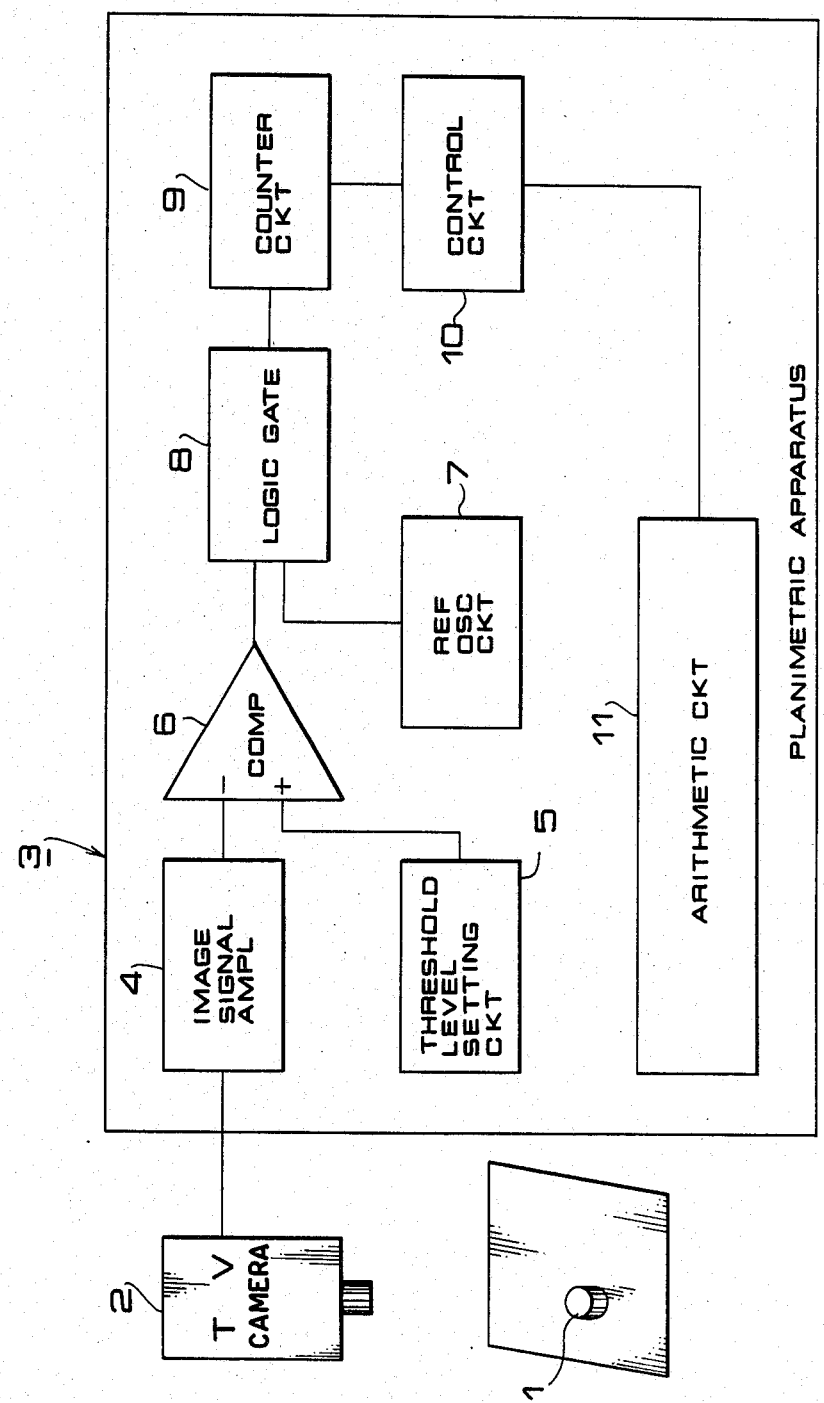

AREA MEASURING APPARATUS USING TELEVISION

BACKGROUND OF THE INVENTION

1. Field of the Invention

The present invention relates to an area measuring apparatus designed to take an object of measurement with a TV camera, to measure the area of the object on the basis of the television signal corresponding to the area of the object and to store the area data.

2. Description of the Prior Art

The conventional area measuring apparatus employing a vision system stores and an enormous image data in a large scale memory, such as an image memory, and calculates the area according to a predetermined computation algorithm on the basis of the image data stored. However, the conventional planimetric apparatus of such a constitution including a large scale memory is very large in size and needs costly softwares.

SUMMARY OF THE INVENTION

It is an object of the present invention to provide an area measuring apparatus of a simple construction as compared with the above-mentioned conventional apparatus.

An area measuring apparatus according to the present invention comprises: a comparator for sorting the image signal obtained by taking an object of measurement with a TV camera into a component corresponding to the object of measurement and a component corresponding to an element other than the object of measurement and for converting those components into binary signals of different levels respectively; a gate circuit which allows a clock signal to pass only when the output signal of the comparator is either one of those binary signals; a counter circuit which counts the pulses of the clock signal which has passed the gate circuit; and an arithmetic circuit which takes the pulse number counted by the counter circuit and corresponding to one frame of the image signal and calculates the area of the object of measurement on the basis of the pulse count corresponding to one frame of the image signal.

The image signal is converted into the corresponding binary signal by making use of the difference in the level of brightness between an object of measurement and the background, in which the component of a level above a predetermined threshold level and the component of a level below the threshold level are shifted to a high level and to a low level respectively.

BRIEF DESCRIPTION OF THE DRAWINGS

FIG. 1 is a block diagram of an area measuring apparatus according to the present invention;

DETAILED DESCRIPTION OF THE PREFERRED EMBODIMENT

Figure 1A:
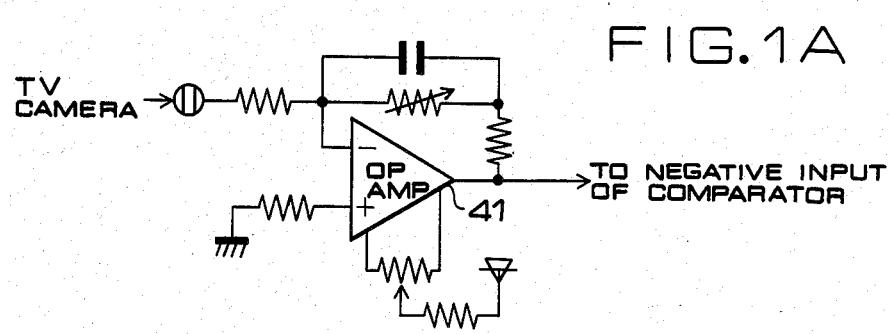
FIGS. 1A through 1F are schematic diagrams showing in detail the arrangement of the major component blocks in FIG. 1

An area measuring apparatus, in a preferred embodiment according to the present invention, will be described hereinafter in connection with the accompanying drawings. Referring to FIG. 1, indicated at 1 is an object of planimetric measurement. This exemplary object has a cylindrical form and is placed against a suitable background differing greatly in brightness or in reflectivity from the surface of the object. When the surface of the object 1 is white or a color similar to white, the preferable color of the background is black. Indicated at 2 is an ordinary TV camera, which is directed toward the object 1. The TV camera 2 is disposed with its optical axis aligned with the center axis of the object 1 to take one of the circular end faces of the object 1. When the image signal given by the TV camera is processed through an ordinary signal processing circuit and displayed on the screen of the CRT of a monitor TV set 12 in a circular area 13 as shown in FIG. 2, the circular area 13 is brighter than the surrounding area 14. According to the fundamental principle of the present invention, the area of the object 1 of measurement is measured through the measurement of the area 13 by the use of an image signal given by a TV camera without touching the object 1.

An area measuring apparatus or a planimetric apparatus 3 according to the present invention comprises an image signal amplifier 4, a threshold level setting circuit 5, a comparator 6, a reference oscillation circuit 7, a logical gate circuit 8, a counter circuit 9, a control circuit 10 and an arithmetic circuit 11. The arithmetic circuit 11 has a memory circuit to store the input data temporarily.

FIGS. 1A through 1F show, as an example, the particular arrangement of the image signal amplifier 4, threshold level setting circuit 5, reference oscillation circuit 7, logical gate circuit 8, counter circuit 9, and control circuit 10.

Figure 1B:
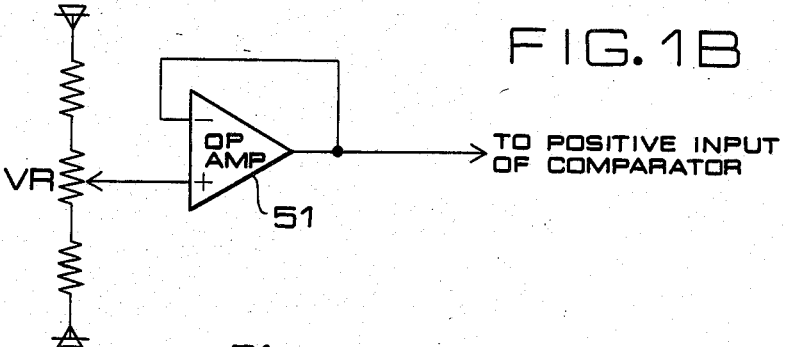
Figure 1C:
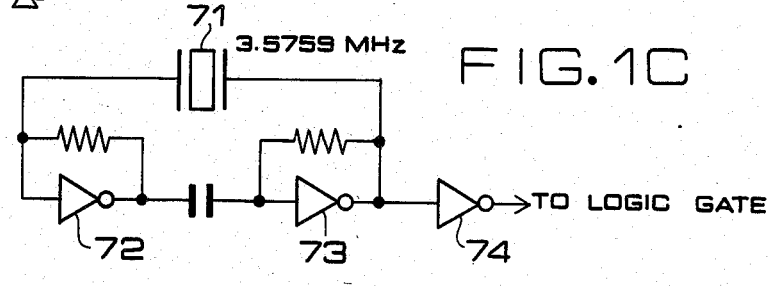
Figure 1D:
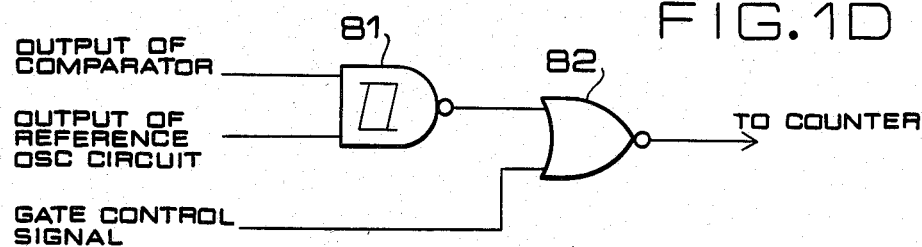
Figure 1E:
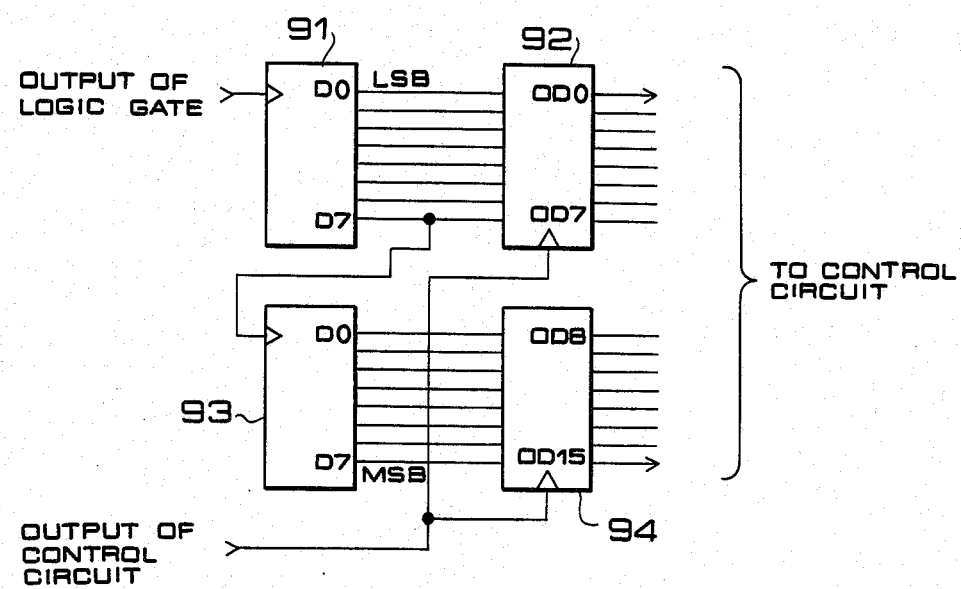
Figure 1F:
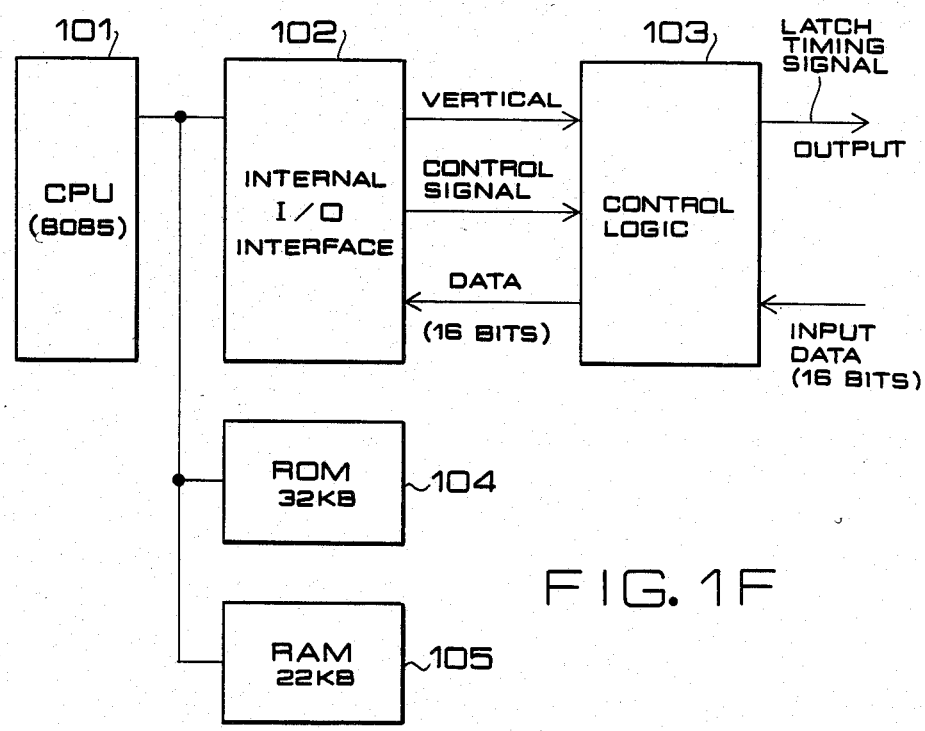

As shown in FIG. 1A the image signal amplifier 4 is a usual analog signal amplifier including an operational amplifier 41, resistors and a capacitor, and its output signal is delivered to the negative input terminal of the comparator 6. The threshold level setting circuit 5 shown in FIG. 1B is made up of a variable resistor VR with its end terminals connected across a d.c. power source, and an operational amplifier 51 which produces a voltage in proportion to a voltage level set up by the variable resistor VR and delivers the voltage to the positive input terminal of the comparator 6. The reference oscillation circuit 7 is used to produce the count value representing the area of object to be measured, and its oscillation frequency is one of factors determinative of the measurement accuracy. The reference oscillation circuit 7 can be a self oscillation circuit, as shown in FIG. 1C, consisting of an oscillation element 71 having a high intrinsic oscillation frequency, e.g., 35.759 MHz, three inverters 72, 73 and 74, resistors and a capacitor. The logical gate circuit 8 is enabled to pass the oscillation output from the reference oscillation circuit 7 to the counter circuit 9 only when the output of the comparator 6 is at specified one of two levels, and it is made up of a NAND gate 81 and NOR gate 82 as shown in FIG. 1D. The counter circuit 9 operates to count the number of pulse signals provided by the logical gate circuit 8, and the count for one frame of image signal from the TV camera is latched in response to the vertical sync pulse, then delivered to the control circuit 10. FIG. 1E shows, as an example, the particular arrangement of the counter circuit 9, that consists of two 8-bit counters 91 and 93 and associated latches 92 and 94 to complete a 16-bit counter with a count range from 0000 to FFFF in hexadecimal. Finally, the control circuit 10 and arithmetic circuit 11 in combination are made up of a CPU 101, interface 102, control logic 103, ROM 104, and RAM 105 as shown in FIG. 1F. The CPU 101 operates on the counter circuit 9 to perform counting in synchronism with the vertical sync pulse so that the count for one frame of picture is latched, and receives the latched count as data representing the area of object.

In operation, an image signal obtained through taking the object 1 with the TV camera 2 is given to the amplifier 4, where the image signal is amplified to a predetermined level, and then the amplified image signal is transfered to the comparator 6. The comparator 6 compares the output level of the amplifier with a threshold level set by the threshold level setting circuit 5. When the output level of the amplifier is higher than the threshold level, the comparator 6 gives a predetermined output signal. The threshold level is slightly higher than the level of a signal for forming the area 14 as shown in FIG. 2. Accordingly, the output signal given by the comparator 6 is a signal component of the image signal given by the TV camera remaining after the elimination of a signal component for forming the area 14 corresponding to the background from the image signal, namely, only an image signal for the area 13 corresponding to the object 1 of measurement. The binary output signal given by the comparator 6 is transferred to the logical gate circuit 8.

The logical gate circuit 8 is an AND circuit which receives clock pulses of an optionally fixed frequency provided by the reference oscillation circuit 7 at one of the input terminals and the output signal of the comparator 6 at the other input terminal and performs logical AND operation for those two input signals. Accordingly, the clock pulses are allowed to pass through the logical gate circuit 8 and are transferred to the counter circuit 9 only while the logical gate circuit is opened by the output signal of the comparator 6, that is, only while an image signal corresponding to the object of measurement is sent out from the TV camera.

The counter circuit 9 counts the clock pulses applied thereto through the logical gate circuit 8. The count corresponding to a single frame of the TV screen, namely, the count counted within a period from the arrival of one vertical synchronizing signal to the arrival of the next vertical synchronizing signal, is stored in the memory circuit of the arithmetic circuit 11 under the control of the control circuit 10. The count thus stored is converted into the corresponding area according to a predetermined system. The area thus obtained through the conversion of the count corresponds to the area of the object 1 of measurement.

Figure 1G:
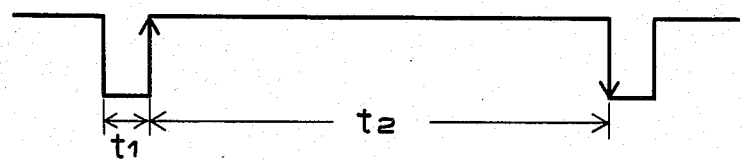
FIG. 1G shows the waveform of the vertical sync pulse.

The role of the control circuit 10 will be described in further detail. FIG. 1G shows the waveform of the vertical sync pulse, with a time length t1 being spent when the scanning line moves from one frame to another, while a time length t2 being spent for scanning a complete frame. The control circuit 10 detects the rising edge of the vertical sync pulse at the end of the t1 duration, and produces the gate control signal to activate the counter circuit 9 at this time point. Then, the counter circuit 9 starts to count pulses received during a period of t2. Upon detection of the falling edge of the vertical sync pulse by the control circuit 10 at the end of the t2 period, the count of the counter circuit 9 is latched, and the counter circuit 9 is cleared after its contents have been transferred to the control circuit 10. The count data received by the control circuit 10 represents the duration of the image signal in one frame corresponding to the image portion of the object under measurement. The arithmetic circuit 11 operates to calculate the area of object through the following process for the difference of counts obtained from TV images with and without the object.

Figure 2A:
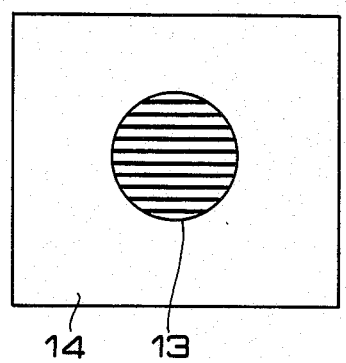
FIGS. 2A and 2B are views of the TV screen, showing scanning the lines of the image when an object exists within the field of the TV camera and a typical sight when no object exists, respectively.
Figure 2B:
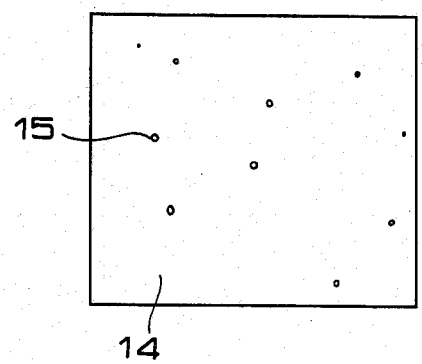
Figure 2:
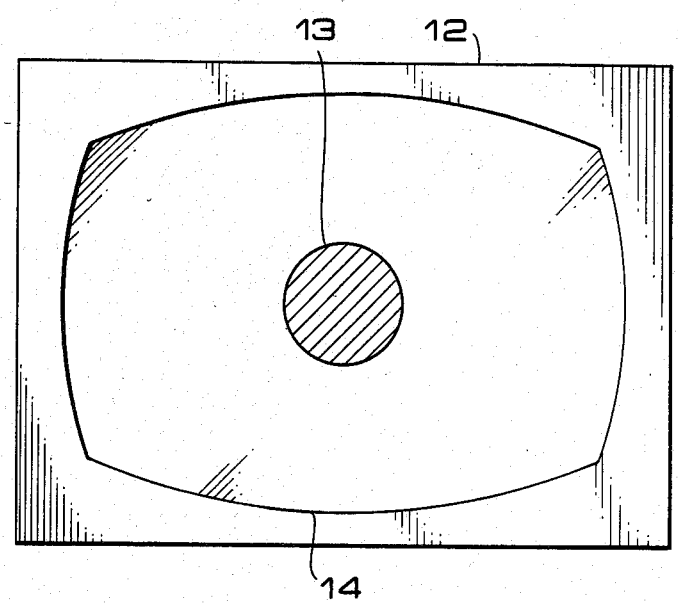
FIG. 2 is a view showing the pattern of an image signal taken with the TV camera of FIG. 1 and displayed on the screen of a monitor TV set.

In FIG. 2A showing part of the illustration of FIG. 2, scanning lines are enlarged and shown by solid lines for the explanatory purpose only in a region 13 of the object image. In the entire scanning period for one frame of a picture, the counter circuit 9 operates only for a time length corresponding to the solid line sections. The count value (in the form of 16-bit data in this embodiment) obtained by this operation represents the total area of the image of the object under measurement. In practice, however, the count does not become zero when the object is removed due to extraneous factors such as the condition of illumination and images of dusts 15 existing in the background as shown in FIG. 2B.

Accordingly, it is recommended to calculate the area of object as follows.

$$C = A - B$$

where A represents the count obtained from the image signal at the presence of the object, B represents the count obtained from the image signal at the absence of the object, and C represents the probable area of the object.

The arithmetic circuit 11 can have a calibration function, in which an object of known area is subjected to the aforementioned measurement to evaluate the ratio of the measured area (count value) to the actual area, and this ratio is used to convert the measured area of an unknown object into the value of arbitrary unit.

As has been mentioned previously, the accuracy of the measured area is enhanced with the increase in the oscillation frequency of the reference oscillation circuit 7, and the upper limit of the frequency is determined from the capacity of the counter circuit 9 which must not overflow when the entire frame is occupied by the image of object. For example, a 16-bit counter has a capacity of FFFF in hexadecimal (65535 in decimal), and for the vertical sync signal of 60 Hz, the bit interval is $1/60 \div 65535 = 25.4313$ μs, that corresponds to 3.93216 MHz, the highest possible frequency set for the reference oscillation circuit. In another example for the counter circuit of 20 bits having a capacity of FFFFF in hexadecimal (1048576 in decimal), the bit interval is given as $1/60 \div 1048.576 = 1048576$ μs, that corresponds to a frequency of 62.914560 MHz.

The embodiment of the present invention operates generally as described hereinbefore. However, in the practical operation, the difference between a measured data obtained by taking the object 1 of measurement against a suitable background under suitable illumination and a measured data obtained by taking only the same background after removing the object 1 of measurement under the same illumination is used to obtain more accurate measured data.

In the description given hereinbefore, the object 1 of measurement is taken by the TV camera as the object 1 is illuminated more brightly than the background, however, the object and the background may be reversed in brightness. When a black object of measurement is placed against a bright background, namely, when the background is brighter than the object of measurement, the measurement is attained only by adapting the comparator 6 so that an output signal of a level lower than a predetermined threshold level is given by the comparator 6 to drive the logical gate circuit.

Thus, according to the present invention, an image signal obtained by taking an object of measurement is converted into the corresponding binary signal by comparing the image signal with a predetermined threshold level and a clock signal is gated according to the binary signal and is counted, therefore, the measured data of the area of an object of measurement can be obtained simply and inexpensively only through the simple change of the hardwares.

What is claimed is:

1. An area measuring apparatus for measuring the area of an object of measurement by the use of an image signal obtained by taking the object with a TV camera, comprising:

a threshold of a level between the signal level of a component of the image signal corresponding to the object of measurement and the signal level of a component of the image signal corresponding to a background against which the object of measurement is placed;

a comparator which compares the image signal with the threshold and provides binary output signals of different levels corresponding to a component of a level higher than the threshold and a component of a level lower than the threshold respectively;

a reference oscillation circuit which generates a clock signal of a predetermined frequency;

a gate circuit which allows the passage of the clock signal only when the level of the binary signal corresponds to either one of said two levels;

a counter circuit which counts the pulses of the clock signal transmitted thereto through the gate circuit; and an arithmetic circuit which stores the pulse count counted by the counter circuit and corresponding to a single frame of the image signal and computes the area of the object of measurement on the basis of the pulse count corresponding to the single frame;

said arithmetic circuit computing the difference between the pulse count counted by the counter circuit with the presence of the object of measurement and the pulse count counted by the counter circuit in the absence of the object of measurement.

2. An apparatus according to claim 1, wherein there is provided an additional control circuit which controls said arithmetic circuit so that the arithmetic circuit stores the pulse count within every period between the arrival of two successive vertical synchronizing signals of said image signal.

3. An apparatus according to claim 1, wherein said object under measurement has a black background, and wherein said gate circuit is enabled by the output of said comparator when a component of said image signal at a level higher than said threshold level is given to said comparator.

4. An apparatus according to claim 1 further comprising an amplifying circuit for amplifying the image signal supplied to said comparator.

5. An apparatus according to claim 4, wherein said amplifying circuit comprises an analog signal amplifying circuit including an operational amplifier.

6. An apparatus according to claim 1, wherein said threshold setting circuit comprises a variable resistor with both end terminals thereof being connected across a d.c. voltage source, and an operational amplifier which provides a voltage in proportion to a voltage set up by said variable resistor to one input terminal of said comparator.

7. An apparatus according to claim 1, wherein said reference oscillation circuit comprises a self oscillation circuit including an oscillation element having a predetermined intrinsic oscillation frequency.

8. An apparatus according to claim 1, wherein said gate circuit comprises a NAND gate receiving the outputs of said comparator and said reference oscillation circuit, and a NOR gate receiving the output of said NAND gate and a gate control signal.

9. An apparatus according to claim 1, wherein said counter circuit comprises a counter which counts output pulses from said gate circuit for a duration of one frame of said image signal.

10. An apparatus according to claim 9, wherein said counter comprises a 16-bit counter, and wherein the vertical sync signal of said image signal has a frequency of 60 Hz and said reference oscillation circuit has an oscillation frequency of 3.932160 MHz or lower.

11. An apparatus according to claim 9 wherein said counter comprises a 20-bit counter, and wherein the vertical sync signal of said image signal has a frequency of 60 Hz and said reference oscillation circuit has an oscillation frequency of 62.914560 MHz or lower.

* * * * *